United States Patent [19]
Goto et al.

[11] Patent Number: 5,391,058
[45] Date of Patent: Feb. 21, 1995

[54] FLUIDIC APPARATUS

[75] Inventors: Kunifumi Goto; Nobuaki Hoshino; Tatsuyuki Hoshino; Takashi Ban; Shigeru Suzuki, all of Kariya; Ken Suzuki, Kanagawa; Akira Umebayashi, Kanagawa; Yukiharu Yusa, Kanagawa, all of Japan

[73] Assignees: Kabushiki Kaisha Toyoda Jidoshokki Seisakusho, Kariya; NHK Spring Co., Ltd., Yokohama, both of Japan

[21] Appl. No.: 34,232

[22] Filed: Mar. 22, 1993

[30] Foreign Application Priority Data

Mar. 23, 1992 [JP] Japan .................. 4-064777

[51] Int. Cl.⁶ ............................................. F09B 49/02
[52] U.S. Cl. .................................. 417/223; 417/269; 464/57
[58] Field of Search ............. 417/223, 269; 92/71; 464/57; 403/229, 291

[56] References Cited

U.S. PATENT DOCUMENTS

| | | | |
|---|---|---|---|
| 981,869 | 1/1911 | Miller | 464/57 |
| 1,387,726 | 8/1921 | Karge | 464/57 |
| 1,431,401 | 10/1922 | Hupp | 464/57 |
| 2,012,916 | 8/1935 | Pott | 464/57 |
| 2,936,625 | 5/1960 | Heiseler | 464/57 |
| 3,030,783 | 4/1962 | Schmidt | 464/57 |
| 3,602,010 | 8/1971 | Hines | 464/57 |
| 3,832,866 | 9/1974 | Thomson | 464/57 |
| 4,226,095 | 10/1980 | Loken | 464/57 |
| 4,924,839 | 5/1990 | Mueller et al. | 464/57 |
| 5,086,900 | 2/1992 | Kikuta et al. | 464/57 |

FOREIGN PATENT DOCUMENTS

| | | | |
|---|---|---|---|
| 62-117571 | 7/1987 | Japan . | |
| 1303311 | 12/1989 | Japan | 464/57 |
| 82045 | 11/1934 | Sweden | 464/57 |

Primary Examiner—Richard A. Bertsch
Assistant Examiner—Peter Korytnyk
Attorney, Agent, or Firm—Brooks Haidt Haffner & Delahunty

[57] ABSTRACT

A fluidic apparatus includes a pulley driven by an engine, torque limiting means disposed in the pulley and adapted to shut off the transmission of driving force transmitted by the pulley when overload is applied thereto, and a driving shaft driven by the torque limiting means. The torque limiting means includes a boss formed coaxially with the pulley, a collar disposed integrally and coaxially with the driving shaft, and a coiled spring adapted to hold outer peripheral surfaces of the boss and the collar by tightening with a predetermined tightening allowance. With the torque limiting means, if abnormal loads should be applied to the driving shaft, there hardly occur internal breakages, or the like, in the fluidic apparatus. In addition, because the torque limiting means has such a simple construction, the fluidic apparatus is down-sized and reduced in manufacturing cost.

9 Claims, 6 Drawing Sheets

FLUIDIC APPARATUS

BACKGROUND OF THE INVENTION

1. Field of the Invention

The present invention relates to an improvement on a fluidic apparatus such as a pump, a compressor, or the like. For instance, when a fluidic apparatus according to the present invention is embodied as a variable capacity pump which starts up at substantially zero capacity, the variable capacity pump can be applied appropriately to a refrigerating circuit including a refrigerant compressor driven by a hydraulic motor, and thereby it effectively operates the refrigerant compressor by way of the hydraulic motor, and it can be also applied appropriately to hydraulic operation systems of vehicles equipped with special purpose machines, and thereby it effectively drives the special purpose machines.

2. Description of the Related Art

Figure 8:
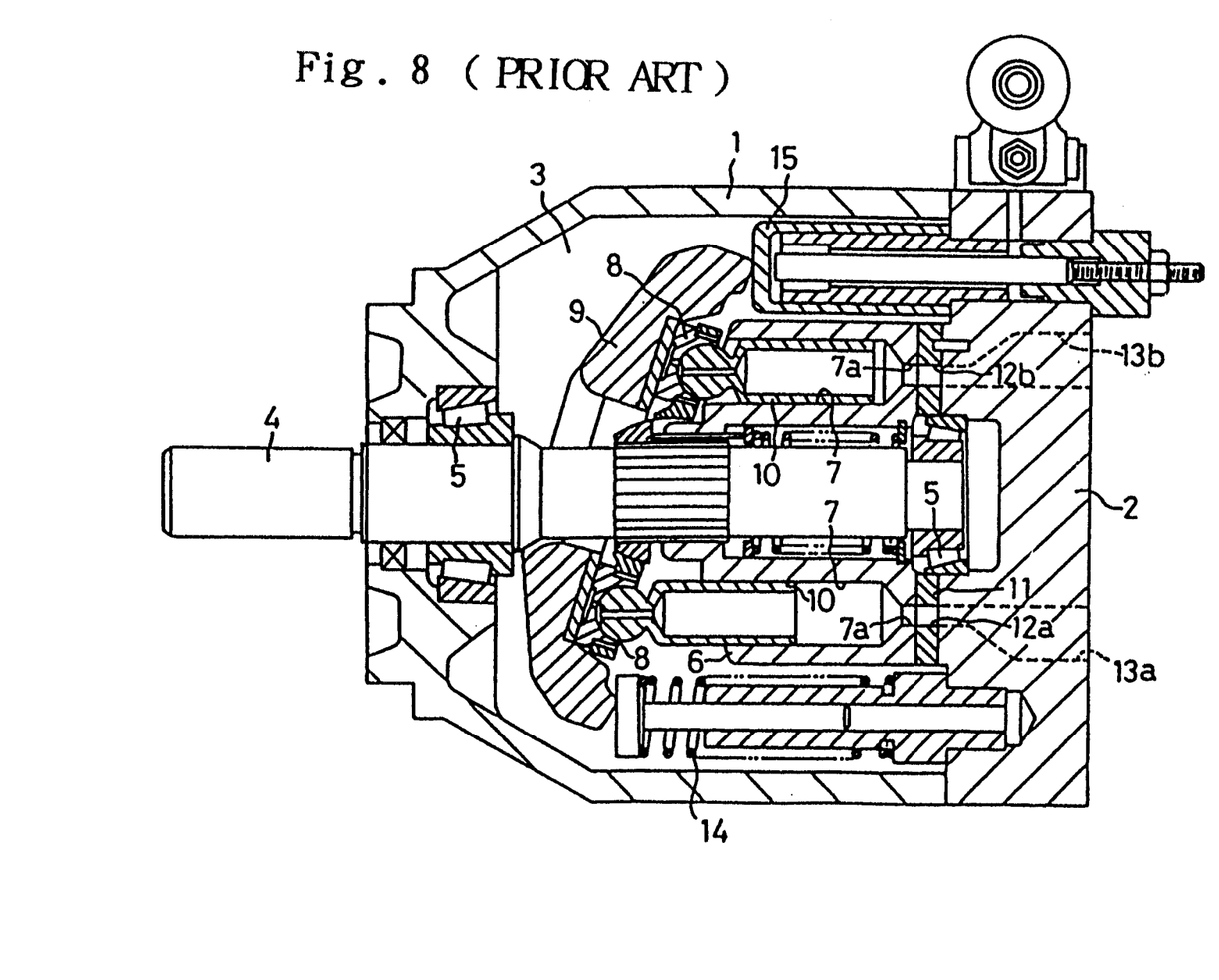
FIG. 8 is a cross-sectional view of a conventional variable capacity piston pump.

There have been axial piston pumps (hereinafter simply referred to as "pumps") which have been used in a variety of industrial machines and vehicles. FIG. 8 illustrates one of the conventional pumps, e.g., a variable capacity piston pump equipped with a mechanism adapted for adjusting the inclination angle of the swash plate.

In the conventional pump, there is formed an operating space 3 with a casing 1 and an end cover 2 which encloses an open end of the casing 1. A driving shaft 4 is disposed in the operating space 3, it is supported rotatably by the casing 1 and the end cover 2 by way of a pair of bearings 5, 5, and it is further connected to an input shutting-off mechanism (not shown) which comprises an electromagnetic clutch. A cylinder block 6 is disposed around the driving shaft 4, it is adapted to rotate together with the driving shaft 4 in the operating space 3, and it includes a plurality or, bores 7 disposed around the axial center line and parallel therewith. A plurality of pistons 10 are disposed reciprocatively in the bores 7, and they are installed to a swash plate 9 by way of shoes 8.

A valve plate 11 is fixed to the end cover 2 so as to enclose the open end of the bores 7, and it is provided with an inlet port 12a and an outlet port 12b. The ports 12a and 12b are drilled through the valve plate 11 in arc forms which oppose each other and correspond to the rotary locus of the openings of the bores 7, and they are formed so as to match ends of an inlet opening 13a and an outlet opening 13b. The inlet opening 13a and the outlet opening 13b are formed in identical forms with those of the ports 12a and 12b at the ends.

Thus, as the cylinder block 6 rotates together with the driving shaft 4, one of the pistons 10 installed to the swash plate 9 is reciprocated so as to increase the volume of the enclosed space in one of the bores 7, and accordingly the hydraulic oil is suctioned into one of the bores 7 through the inlet port 12a corresponding thereto. On the other hand, another one of the pistons 10 is reciprocated so as to decrease the volume of the enclosed space in another one of the bores 7, and accordingly the hydraulic oil is discharged from another one of the bores through the outlet port 12b corresponding thereto.

The swash plate 9 is supported by a trunnion type supporting shaft (not shown), and it is urged by a control spring 14 so as to always increase the inclination angle of the swash plate 9. A control cylinder 15 is disposed so as to oppose the control spring 14, and it is advanced or retracted by hydraulic pressures. With these constructions, the inclination angle of the swash plate 9, i.e., the theoretical discharge per revolution of the conventional pump, can be varied or adjusted.

There arises a case where the relatively complicated and expensive input shutting-off mechanism should be removed in order to reduce the weight of the hydraulic operation system equipped with the conventional pump and to simplify the construction thereof. Even if the input shutting-off mechanism is removed, there arises no drawback as far as a normal load is applied to the driving shaft 4 of the conventional pump.

However, in the case that worn particles, or the like, intrude in a discharge passage, or the like, and they block the discharge passage, in the case that insufficient lubrication occurs and it results in the seizure at the sliding portions between the pistons 10 and the bores 7, between the end surfaces of the cylinder block 6 and the valve plate 11, and between the shoes 8 and the swash plate 9, there arise abnormal operations where high loads are applied to the driving shaft 4. Even when such abnormal operations happen, the driving shaft 4 is kept rotating forcibly by an engine, and eventually internal breakages occur.

In order to avoid this drawback, the conventional pump is provided with a relief valve so as to avoid the blocked discharge passage, or as set forth in Japanese Unexamined Utility Model Publication (KOKAI) No. 62-117,571, a compressor is provided with a locking sensor which is adapted to sense the seizure at the sliding portions. However, these counter measures result in substantially increasing manufacturing cost because the increasing discharge pressure, the increasing temperature, or the rotary or non-rotary state must be detected.

SUMMARY OF THE INVENTION

It is therefore an object of the present invention to provide a fluidic apparatus in which the internal breakages are prevented by a relatively less expensive counter measure even when abnormal loads are applied to its driving shaft.

In order to fulfill the aforementioned object, a fluidic apparatus according to the present invention comprises:
a pulley driven by an engine;
torque limiting means disposed in the pulley and adapted to shut off the transmission of driving force transmitted by way of the pulley when overload is applied thereto; and
a driving shaft driven by the torque limiting means;
the torque limiting means including:
a boss formed coaxially with the pulley;
a collar disposed integrally and coaxially with the driving shaft; and
a coiled spring adapted to hold outer peripheral surfaces of the boss and the collar by tightening with a predetermined tightening allowance.

In the present fluidic apparatus, the coiled spring can be wound in a direction identical with the rotary direction of the pulley.

In the present fluidic apparatus, the coiled spring can be fixed to either the boss or the collar at an end.

In the present fluidic apparatus, the coiled spring can be wound more in a number of turns over the outer peripheral surface of the boss than over the outer peripheral surface of the collar, or vice versa.

The present fluidic apparatus can further comprise a swash plate disposed inclinably on the shaft, a control spring adapted to urge the swash plate so as to always reduce the inclination angle of the swash plate, a control cylinder adapted to urge the swash plate so as to oppose the control spring and increase the inclination angle of the swash plate, and an opening and closing valve disposed in a pressure fluid passage adapted to introduce pressure fluid into the control cylinder, thereby operating the fluidic apparatus as a variable capacity pump.

In various machines in which the present fluidic apparatus is embodied, the torque limiting means is disposed between the pulley driven by the engine and the driving shaft. Accordingly, as far as a normal load is applied to the driving shaft, the pulley and the driving shaft are connected by the torque limiting means, and the driving force of the engine is transmitted to the driving shaft by way of the torque limiting means even without the conventional input shutting-off mechanism.

Specifically speaking, in the torque limiting means of the present fluidic apparatus, the boss is formed coaxially with the pulley, and the collar is disposed integrally and coaxially with the driving shaft. Further, the outer peripheral surfaces of the boss and the collar are held firmly by the coiled spring which is provided thereon with a predetermined tightening allowance. The coiled spring provided with a predetermined tightening allowance herein means, for example, that the inside diameter of the coiled spring is set smaller than the outside diameters of the boss and the collar. As a result, there is exerted a frictional force, resulting from the tightening allowance, between the outer peripheral surfaces of the boss and the coiled spring and between the outer peripheral surfaces of the collar and the coiled spring, respectively. Thus, the boss and the collar are put into a connected state by the frictional force, and accordingly the pulley and the driving shaft are rotated synchronously.

If a discharge passage of the present fluidic apparatus should be blocked by foreign matter when the present fluidic apparatus is operated steadily, or if the lubrication should be insufficient so that the seizure occurs at the sliding portions thereof regardless of the operating state, or if abnormal operation occurs, the boss and the collar in the torque limiting means are drivingly decoupled from each other by such high loads to which the driving shaft is subjected. As a result, the driving force of the engine cannot be transmitted to the driving shaft.

Namely, when abnormal operations arise, high loads are applied to the driving shaft, and thereby the coiled spring comes to slip either on the outer peripheral surface of the boss or on the outer peripheral surface of the collar against the frictional force resulting from the tightening allowance. As a result, the pulley and the driving shaft are not rotated synchronously. The high load at the moment is hereinafter referred to as a "slippage torque." Thus, there occur no internal breakages such as the breakage of the discharge passage, the breakage at the sliding portions, and the like, and the present fluidic apparatus can be repaired back to the original performance.

Hence, the present fluidic apparatus is not associated with the increasing manufacturing cost because the torque limiting means having the aforementioned relatively simple construction is disposed in the pulley and it shuts off the unnecessary torques from being transmitted to the driving shaft when the abnormally increasing loads are applied to the driving shaft.

Further, when the coiled spring is wound in a direction identical with the rotary direction of the pulley in the present fluidic apparatus, the coiled spring is subjected to forces which loosen the coiled spring in the connected state and the shut-off state. For instance, let us consider the case where the pulley is rotated in the right or clockwise direction and the coiled spring is wound in the same right or clockwise direction. Under these circumstances, a rotary force is exerted to the coiled spring on the boss side in the right or clockwise direction so as to loosen the coiled spring, and a frictional force is exerted thereto on the collar side in the left or counterclockwise direction so as to loosen the coiled spring.

That is, when the coiled spring slips on the outer peripheral surface on the boss side and the torque limiting means is put into the shut-off state, the right or clockwise direction rotary force is exerted to the stationary coiled spring by the outer peripheral surface of the boss rotating in the right or clockwise direction, and thereby the coiled spring is loosened.

On the other hand, when the coiled spring slips on the outer peripheral surface on the collar side and the torque limiting means is put into the shut-off state, the coiled spring keeps rotating in the right or clockwise direction, and the collar is put into the stationary state. When the coiled spring and the collar are viewed the other way around relatively, the coiled spring can be viewed to be put into the stationary state, and the collar can be viewed to be rotated in the left or the counterclockwise direction. Accordingly, a rotary force is exerted to the stationary coiled spring by the outer peripheral surface of the collar rotating in the left or counterclockwise direction, and thereby the coiled spring is loosened.

The present fluidic apparatus whose coiled spring is wound in the aforementioned manner can exert the slippage torque repeatedly with better accuracy than the present fluidic apparatus whose coiled spring is wound in the direction opposite to the rotary direction of the pulley and in which the rotary force of the boss and the frictional force of the collar are exerted to tighten the coiled spring. In the former present fluidic apparatus, it is believed that the slippage torque is affected less by the surface roughness of the slipping surfaces, and that the slippage torque is hardly affected even when the lubrication varies on the slipping surfaces. Additionally, in the former present fluidic apparatus, the slippage torque is hardly exerted on the driving shaft even when the coiled spring slips for a long period of time, and consequently the construction of the former present fluidic apparatus is safe and durable.

Furthermore, when the coiled spring is fixed to either the boss or the collar at an end in the present fluidic apparatus, the coiled spring is subjected not only to the frictional force on one of the boss side and the collar side but also to an engaging force on one of the sides, and the torque limiting means is always put into the shut-off state on the other side. As a result, in the present fluidic apparatus thus modified, the outer peripheral surface of either the boss or the collar can be adapted for the portion on which the coiled spring slips during the shut-off state in accordance with the replaceability, the refrigerateability, or the like, of the component parts.

Moreover, when the coiled spring is wound more in a number of turns over the outer peripheral surface of the boss than over the outer peripheral surface of the collar, or vice versa in the present fluidic apparatus, the coiled spring is subjected to the frictional force stronger on one of the boss side and the collar side than on the other side, and the torque limiting means is always put into the shut-off state on the other side. As a result, also in the present fluidic apparatus thus modified, the outer peripheral surface of either the boss or the collar can be adapted for the portion on which the coiled spring slips during the shut-off state in accordance with the replaceability, the refrigerateability, or the like, of the component parts.

In addition, when the present fluidic apparatus further comprises a swash plate disposed inclinably on the shaft, a control spring adapted to urge the swash plate so as to always reduce the inclination angle of the swash plate, a control cylinder adapted to urge the swash plate so as to oppose the control spring and increase the inclination angle of the swash plate, and an opening and closing valve disposed in a pressure fluid passage adapted to introduce pressure fluid into the control cylinder, the fluidic apparatus is operated as a variable capacity pump whose capacity can be varied from substantially zero capacity to a larger capacity. The fluidic apparatus thus modified as a variable capacity pump can be operated as follows in addition to the above-described operations.

In the case that an actuator, e.g., a hydraulic motor, or the like, is put into the standby state, the opening and closing valve, disposed in the pressure fluid introduction passage for the control cylinder, is put into the closed state. Accordingly, even when the pump is actuated, the swash plate is kept to hold the minimum inclination angle, e.g., from 0.1 to 1 degree approximately, equivalent to the zero capacity so as to substitute the clutch or turning-off function.

Then, when the opening and closing valve is switched to the opened state by a signal or switch which instructs to substantially start the pump operation, the pressure fluid is pressurized by a slight increase in the inclination angle of the swash plate, and it is supplied gradually to the control cylinder by way of the opening and closing valve so as to facilitate the advancement of the control piston. Accordingly, the control piston urges the swash plate so as to increase the inclination angle. In other words, the pump starts up smoothly at the minimum capacity equal to the zero capacity, and it proceeds to the steady operation at the maximum capacity when the inclination angle of the swash plate reaches the maximum.

On the other hand, when the opening and closing valve is switched to the closed state by a signal or switch which instructs to substantially terminate the pump operation, the pressure fluid is depressurized by the pressure fluid leakage through the sliding clearances in the cylinder block, by the pressure fluid discharge through the orifice formed in the control cylinder, or the like, and the swash plate is overcome by the urging force of the control spring so that it is displaced gradually to the reduced inclination angle side. Accordingly, the pump proceeds to the minimum capacity equal to the zero capacity while it continues the operation.

As having been described so far, the present fluidic apparatus is constructed as described heretofore or in accordance with the appended claims. Hence, if abnormal loads should be applied to the driving shaft, there hardly occur internal breakages, or the like. In particular, the present fluidic apparatus comprises the torque limiting means which is disposed in the pulley and whose construction is relatively simple. Therefore, the torque limiting means contributes to down-sizing the present fluidic apparatus and reducing the manufacturing cost.

Further, the present fluidic apparatus whose coiled spring is wound in the direction identical with the rotary direction of the pulley can exert the slippage torque repeatedly and with better accuracy than the present fluidic apparatus whose coiled spring is wound in the direction opposite to the rotary direction of the pulley.

Furthermore, when the coiled spring is fixed to either the boss or the collar at an end in the present fluidic apparatus, or when the coiled spring is wound more in a number of turns over the outer peripheral surface of the boss than over the outer peripheral surface of the collar, or vice versa in the present fluidic apparatus, the outer peripheral surface of either the boss or the collar can be adapted for the portion on which the coiled spring slips during the shut-off state in accordance with the replaceability, the refrigerateability, or the like, of the component parts.

In addition, the present fluidic apparatus can be adapted to operate as a variable capacity pump whose capacity is variable from a substantially zero capacity to a larger capacity. If such is the case, the variable capacity pump can be operated continuously.

All in all, the present fluidic apparatus is constructed so simply that it exhibits good on-boardability in vehicles, or the like, and satisfactory operability. In addition to these advantageous effects, it provides high reliability even if an emergency should happen.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which form a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

The First Preferred Embodiment of the present fluidic apparatus will be hereinafter described with reference to FIGS. 1 and 2, and it is constructed as a variable capacity piston pump.

Figure 1:
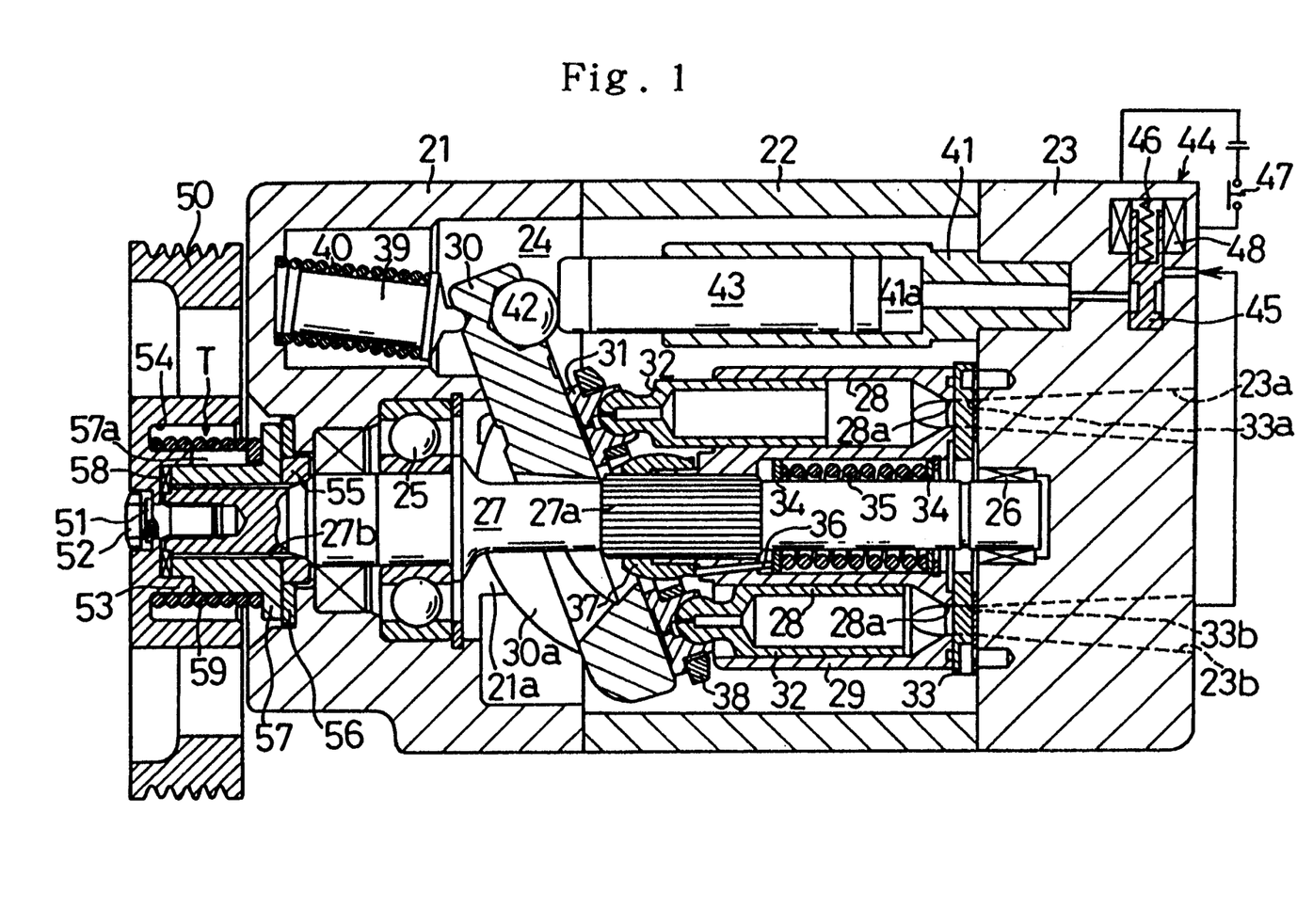
FIG. 1 is a cross-sectional view of a First Preferred Embodiment of a fluidic apparatus according to the present invention which is constructed as a variable capacity piston pump.

As illustrated in FIG. 1, in the First Preferred Embodiment pump, there is formed an enclosed space 24 by a front casing 21, an intermediate casing 22 and an end cover 23. In the enclosed space 24, a driving shaft 27 is disposed between the front casing 21 and the end cover 23, and it is held rotatably by bearings 25 and 26. Around an intermediate spline 27a of the driving shaft 27, a cylinder block 29 is disposed displaceably along the axial center line, and it has a plurality of bores 28 extending parallel to with the axial center line.

In the front casing 21, there is formed a cradle-like concave guide 21a. A swash plate 30 provided with a cradle-like convex portion 30a is held swingably in the cradle-like concave guide 21a, and is installed to a plurality of shoes 31 which are disposed rotatably and slidably. The shoes 31 are installed to pistons 32 which are accommodated reciprocatively in the bores 28 of the cylinder block 29.

Between the cylinder block 29 and the end cover 23, a valve plate 33 is fixed to the end cover 23 so as to enclose the open end of the bores 28, and is provided with an inlet port 33a and an outlet port 33b. The ports 33a and 33b are drilled through the valve plate 33 in arc forms which oppose each other and correspond to the rotary locus of the openings 28a of the bores 28, and they are formed so as to match ends of an inlet opening 23a and an outlet opening 23b which are formed in the end cover 23. The inlet opening 23a and the outlet opening 23b are formed in identical forms with those of the ports 33a and 33b at the ends.

Between the driving shaft 27 and the cylinder block 29, there is formed an annular space on the end cover 23 side. In the annular space, a compression spring 35 is held between front and rear spacers 34 and 34. The front spacer 34 is adapted to press a pivot 37 along the axial center line by way of a pin 36 by an urging force of the compression spring 35. The pivot 37 is installed swingably to shoe retainers 38 which hold the shoes 31 slidably in radial directions. The rear spacer 34 is adapted to press the cylinder block 29 by way of a snap ring by the urging force of the compression spring 35. The cylinder block 29 is pressed in the direction opposite to the direction in which the pivot 37 is pressed.

On the bottom dead center side in the front casing 21, there is disposed an urging rod 39 provided with a control spring 40 therearound. The urging rod 39 is urged by the control spring 40 so as to always reduce the inclination angle of the swash plate 30. On the top dead center side in the end cover 23, which is placed symmetrically about the swash plate 30 with respect to the urging rod 39 and the control spring 40, there is disposed a control cylinder 41. The control cylinder 41 is provided with a control piston 43 which is brought into contact with the swash plate 30 by way of a ball 42. The control piston 43 is caused to advance by supplying discharge pressure fluid into a pressure chamber 41a of the control cylinder 41 by way of an opening and closing valve 44. The opening and closing valve 44 is connected to the outlet opening 23b by an oil piping, and it is provided with a spool 45 having a cut-off which is adapted to introduce discharge pressure fluid. The spool 45 is pressed down by a pressing spring 46 to shut off the communication between the outlet opening 23b and the pressure chamber 41a, and it is adapted to communicate the pressure chamber 41a with the outlet opening 23b when a solenoid 48 is energized by turning on signal instruction means 47.

In front of the front casing 21, there is provided a pulley 50 which is connected to an engine (not shown) by a belt (not shown). The pulley 50 is secured on an end of the driving shaft 27 by a snap ring 51 and a bolt 52, preventing axial while permitting sliding rotational movement of the pulley relative to the driving shaft 27. In the pulley 50, there is disposed torque limiting means "T".

The torque limiting means "T" will be hereinafter described. A boss 53 is formed coaxially with the pulley 50, and a spring chamber 54 is formed radially outwardly around the periphery of the boss 53. A ring 55 is disposed coaxially with the driving shaft 27 so as to engage with a front spline 27b of the drive shaft 27, and the outer peripheral surface of the ring 55 is engaged with a thrust bearing 56 which is slidably brought into contact with an end surface of the front casing 21. In front of the ring 55 and the thrust bearing 56, a collar 57 is disposed coaxially with the driving shaft 27 in engagement with the front spline 27b of the driving shaft 27. The collar 57 is opposed to the rear end surface of the boss 53 of the pulley 50, and it is provided with a grooved slot 57a which is engraved in the axial direction as best shown in FIG. 2. Turning now back to FIG. 1, in front of the collar 57, a thrust bearing 58 is disposed coaxially with the driving shaft 27 so as to engage with the front spline 27b of the driving shaft 27, and it is placed in the boss 53 of the pulley 50.

Figure 2:
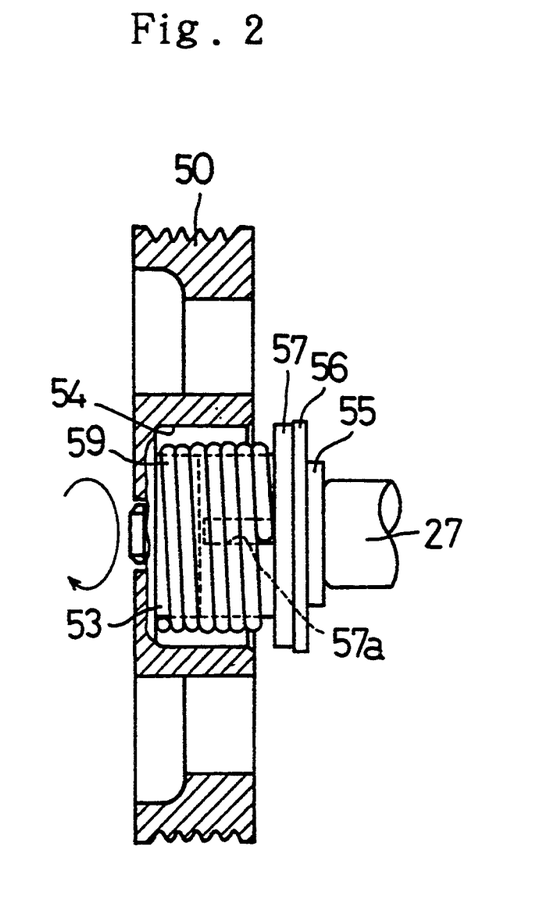
FIG. 2 is a fragmentary view, partially in section, of a portion of the embodiment of FIG. 1 (a First Preferred Embodiment)

As best shown in FIG. 2, the outer peripheral surfaces of the boss 53 and the collar 57 are held by an extension coiled spring 59 with a predetermined tightening allowance. The coiled spring 59 is bent radially inwardly at an end, and it is fixed to the grooved slot 57a of the collar 57 at the end. When the coiled spring 59 is viewed on the side facing the pulley 50, it is wound in the same right or clockwise direction as the rotary direction of the pulley 50, e.g., the right or clockwise direction, and it is fixed to the grooved slot 57a at the innermost end. Moreover, the coiled spring 59 is wound with 2 to 3 turns over the outer peripheral surface of the boss 53, and it is wound with 4 to 5 turns over the outer peripheral surface of the collar 57.

The thus constructed fluidic apparatus of the First Preferred Embodiment, i.e., the variable capacity piston pump, is used for operating a refrigerant compressor in a refrigerating circuit. The operation of the pump will be hereinafter described. The outlet opening 23b is connected to a hydraulic motor (not shown), and the output shaft of the hydraulic motor is connected to the refrigerant compressor (not shown) in the refrigerating circuit. The belt is always driven synchronously with the rotation of the engine, and the signal instruction means 47 is made into a refrigerator switch in a vehicle passenger room. In the pump, as far as a normal load is applied to the driving shaft 27, the driving shaft 27 is connected to the pulley 50 by the torque limiting means "T" disposed in the pulley 50 driven by the engine.

Specifically speaking, in the torque limiting means "T," since the coiled spring 59 is fixed to the grooved slot 57a at the end and since it holds the outer peripheral surfaces of the boss 53 and the collar 57 with a tightening force resulting from the predetermined tightening allowance, the boss 53 of the pulley 50 and the collar 57 disposed integrally and coaxially with the driving shaft 27 are put into the connecting state by an engaging force exerted from the fixed end of the coiled spring 59 and by the tightening force exerted to the outer peripheral surfaces of the boss 53 and the collar 57. The thrust bearing 56 is rotated synchronously with the collar 57, and it is slid between the collar 57 and the front casing 21. As a result, the pulley 50 and the driving shaft 27 are rotated synchronously, and the driving force of the engine is transmitted to the driving shaft 27.

When it is unnecessary to refrigerate the vehicle passenger room, namely when the signal instruction means 47 is turned off, the opening and closing valve 44 is put into the closed state because the spool 45 is urged down by the pressing force of the pressing spring 46. Accordingly, no discharge pressure fluid is introduced into the pressure chamber 41a of the control cylinder 41, and the swash plate 30 is kept to hold the minimum inclination angle "θ," e.g., about 1 degree approximately, equivalent to zero capacity, by the urging force of the control spring 40 so as to substitute the clutch or turning-off function. As a result, even when the pump is driven by the belt which is always put into the connected state, the hydraulic oil is not supplied out of the outlet opening 23b substantially, and the hydraulic motor is not operated. Hence, the refrigerant compressor is put into the terminated state.

When it is necessary to refrigerate the vehicle passenger room, namely when the signal instruction means 47 is turned on, the opening and closing valve 44 is put into the opened state because the spool 45 is raised by the magnetic force of the solenoid 48. Accordingly, discharge pressure fluid is introduced into the pressure chamber 41a of the control cylinder 41 smoothly in accordance with the minimum inclination angle "O" of 1 degree approximately, and thereafter the discharge pressure fluid is pressurized by a slightly increased inclination angle. The thus pressurized discharge pressure fluid is gradually supplied into the pressure chamber 41a of the control cylinder 41 so as to urge the control piston 43. Accordingly, the pressurized discharge pressure fluid facilitates the advancement of the control piston 43, thereby urging the swash plate 30 to increase the inclination angle. That is, the pump starts up smoothly at the minimum capacity equal to the zero capacity. When the inclination angle of the swash plate 30 reaches the maximum, the pump proceeds to steady operation at the maximum capacity. Here, in the case that the swing axis of the swash plate 30 is deviated to the top dead center side with respect to the axial center line of the driving shaft 27, as the pressures in the bores 28 increase, the compressive reaction force is exerted on the swash plate 30 as a moment which acts in a direction so as to increase the inclination angle of the swash plate 30, and consequently the undesirable retardation is prevented during the start-up and the minimum inclination angle of the swash plate 30 can be set to a smaller value.

When the refrigerating is completed and it is unnecessary to refrigerate the vehicle passenger room again, namely when the signal instruction means 47 is turned on and thereafter it is turned off again, the opening and closing valve 44 is switched to the closed state again. Then, the pressure fluid is depressurized by the pressure fluid leakage through the sliding clearances in the cylinder block 29, by the pressure fluid discharge through the return orifice (not shown) formed in the control cylinder 41, or the like, and thereby the discharge pressure fluid is reduced which has been urging the swash plate 30 in the inclination angle increasing direction. As a result, the swash plate 30 is overcome by the urging force of the control spring 40 so as to be displaced gradually to the reduced inclination angle side. Accordingly, the pump proceeds to the minimum capacity equal to the zero capacity while it continues the operation.

If a discharge passage of the pump should be blocked by foreign matter, such as worn particles, or the like, when the pump is operated steadily, or if the lubrication should be insufficient so that the seizure occurs along the sliding portions between the pistons 32 and the bores 28, between the end surface of the cylinder block 29 and the valve plate 33, between the shoes 31 and the swash plate 30, and the like, regardless of the pump operating state, the torque limiting means "T" shuts off the connection between the driving shaft 27 and the pulley 50 in the pump.

Namely, when abnormal operations occur, high loads are applied to the driving shaft 27, and thereby the coiled spring 59 comes to slip on the outer peripheral surface of the boss 53 of the pulley 50 against the frictional force resulting from the tightening allowance. As a result, the pulley 50 and the driving shaft 27 are not rotated synchronously. Thus, the driving force of the engine cannot be transmitted to the driving shaft 27. At this moment, the thrust bearing 58 is brought into sliding contact with the inner end surface of pulley 50, and it is disengaged from the collar 57. Hence, there occur no internal breakages, such as the breakage of the discharge passage, the breakage at the sliding portions, and the like.

Further, since the pump includes the coiled spring 59 which is wound in the same right or clockwise direction as the right or clockwise rotary direction of the pulley 50, the rotary force is exerted to the coiled spring 59 on the boss 53 side in the right or clockwise direction so as to loosen the coiled spring 59, and the frictional force is exerted thereto on the collar 57 side in the left or counterclockwise direction so as to loosen the coiled spring 59 in the connected state and in the shut-off state.

In addition, since the coiled spring 59 is fixed to the grooved slot 57a of the collar 57, and since the coiled spring 59 is wound with 2 to 3 turns over the outer peripheral surface of the boss 53 and it is wound with 4 to 5 turns over the outer peripheral surface of the collar 57, the coiled spring 59 always slips on the outer peripheral surface of the boss 53 in the connected state and in the shut-off state. Hence, this construction of the pump is advantageous when replacing the component parts, and the coiled spring 59 is prevented from being degraded thermally as much as possible because the pulley 50 provides a better refrigerateability than the collar 57 does. With the aforesaid construction, the pump exhibits fine durability.

Second Preferred Embodiment

Figure 3:
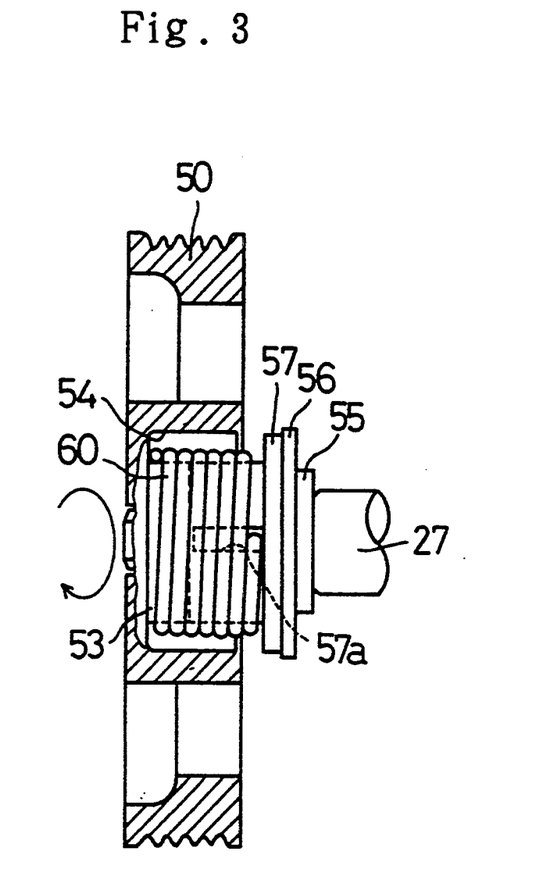
FIG. 3 is a view, similar to FIG. 2, showing a modification (a Second Preferred Embodiment) of the embodiment of FIGS. 1 and 2.

The Second Preferred Embodiment of the present fluidic apparatus is generally identical with the First Preferred Embodiment except that it includes a coiled spring 60 which is wound in the left or counterclockwise direction opposite to the right or clockwise rotary direction of the pulley 50. The other constructions are same as those of the First Preferred Embodiment, and the operations and the advantageous effects will not be described herein.

Since the pump includes the coiled spring 60 which is wound in the left or counterclockwise direction opposite to the right or clockwise rotary direction of the pulley 50, a rotary force is exerted to the coiled spring 60 on the boss 53 side in the left or counterclockwise direction so as to tighten the coiled spring 60, and a frictional force is exerted thereto on the collar 57 side in the right or clockwise direction so as to tighten the coiled spring 60 in the connected state and in the shut-off state.

Evaluation

Figure 4:
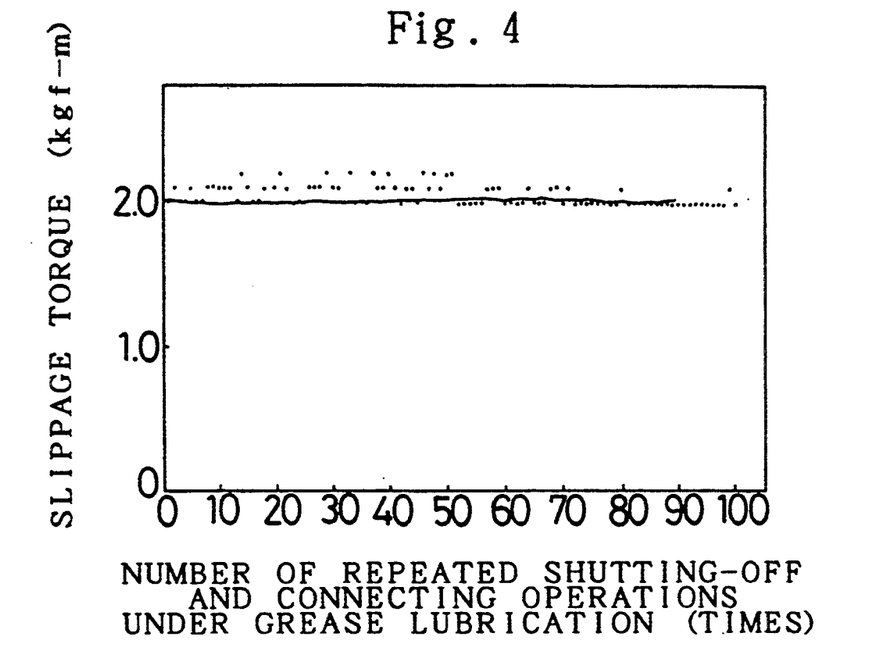
FIG. 4 is a scatter diagram which illustrates the relationship between the number of repeated shutting-off and connecting operations and the slippage torque under grease lubrication exhibited by the embodiment of FIGS. 1 and 2.
Figure 5:
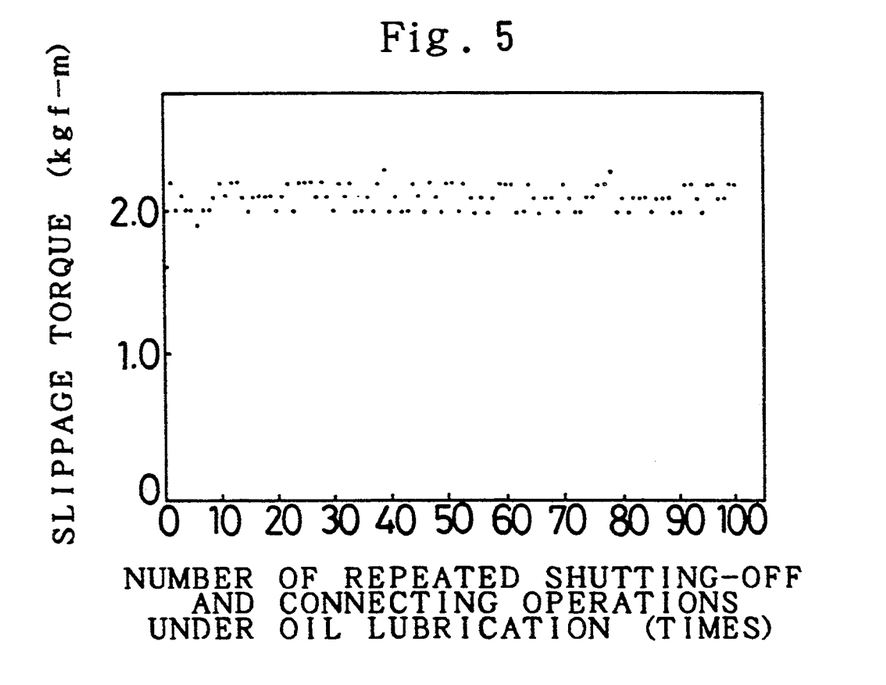
FIG. 5 is a scatter diagram which illustrates the relationship between the number of repeated shutting-off and connecting operations and the slippage torque under oil lubrication exhibited by the embodiment of FIGS. 1 and 2.
Figure 6:
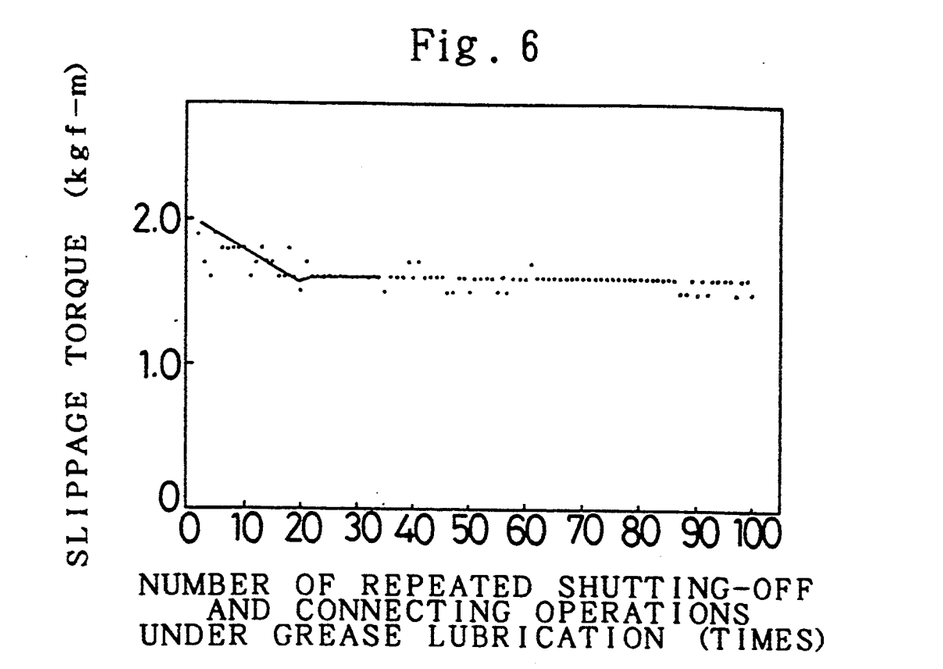
FIG. 6 is a scatter diagram which illustrates the relationship between the number of repeated shutting-off and connecting operations and the slippage torque under grease lubrication exhibited by the embodiment of FIGS. 1 and 3.
Figure 7:
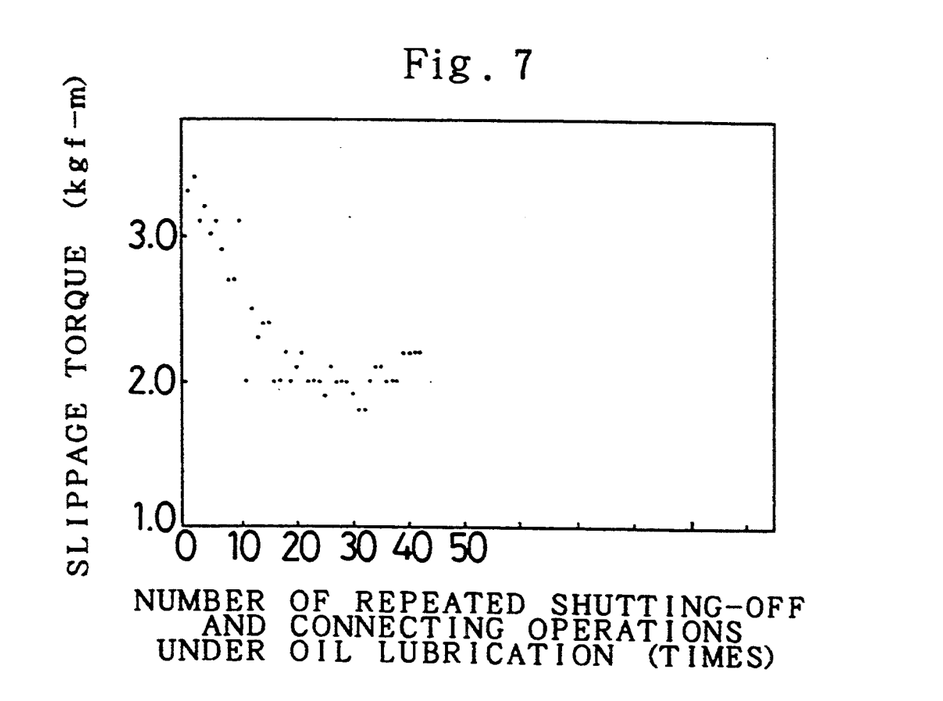
FIG. 7 is a scatter diagram which illustrates the relationship between the number of repeated shutting-off and connecting operations and the slippage torque under oil lubrication exhibited by the embodiment of FIGS. 1 and 3.

The First and Second Preferred Embodiments of the present fluidic apparatus were examined for the repeatability of the slippage torque, and the results are illustrated in FIGS. 4 through 7. Namely, FIGS. 4 through 7 are scatter diagrams which illustrate the relationships between the number of repeated shutting-off and connecting operations (from 1 to 100 times) and the slippage torque (in kgf-m). FIGS. 4 and 5 illustrate the relationships which were exhibited by the First Preferred Embodiment, and FIGS. 6 and 7 illustrate the relationships which were exhibited by the Second Preferred Embodiment. Note that FIGS. 4 and 6 illustrate the relationships exhibited by the First and Second Preferred Embodiment, respectively, under grease lubrication, and FIGS. 5 and 7 illustrate the relationships exhibited by the First and Second Preferred Embodiment, respectively, under oil lubrication.

As can be seen from FIG. 4, the First Preferred Embodiment pump carried out the shutting-off operation with a substantially constant slippage torque of about 2 kgf-m under the grease lubrication right after it was assembled to the time when the shutting-off and connecting operations were repeated 100 times. Further, as illustrated in FIG. 5, the First Preferred Embodiment pump was more likely to exhibit the fluctuating slippage torque at the start-up under the oil lubrication than it did under the grease lubrication. However, the average value of the slippage torques seemed constant during the shutting-off operation.

On the other hand, as can be seen from FIG. 6, the Second Preferred Embodiment pump carried out the shutting-off operation with a slippage torque of about 2 kgf-m under the grease lubrication initially, but it exhibited decreasing slippage torque as the shutting-off and connecting operations were repeated. The slippage torque decreased to about 1.6 kgf-m when the operations were repeated approximately 20 times, and it stabilized thereafter. Further, as illustrated in FIG. 7, the Second Preferred Embodiment pump exhibited a higher slippage torque of about 3.3 kgf-m under the oil lubrication initially, but it exhibited the sharply decreasing slippage torque as the shutting-off and connecting operations were repeated. The slippage torque was decreased to about 2.0 kgf-m when the operations were repeated approximately 20 times, and it stabilized at the value thereafter. Note that the evaluation on the Second Preferred Embodiment pump under the oil lubrication was terminated when the operations were repeated 42 times.

It is understood from the foregoing description that the First Preferred Embodiment pump exerted the slippage torque repeatedly with a better accuracy than the Second Preferred Embodiment pump did. Further, it is appreciated that the slippage torque exerted by the First Preferred Embodiment pump was affected less by the surface roughness of the slipping surfaces than the slippage torque exerted by the Second Preferred Embodiment pump was, and that the slippage torque exerted by the First Preferred Embodiment pump was hardly affected even when the lubrication varied on the slipping surfaces. Furthermore, since the First Preferred Embodiment pump hardly exerted the slippage torque to the driving shaft 27 even when the coiled spring 59 slipped for a long period of time, it was constructed safely or durably.

The First and Second Preferred Embodiment pumps are used for operating the refrigerant compressor in the refrigerating circuit. The pumps can be used also for operating hydraulic operation systems of vehicles equipped with special purpose machines, for example, dump trucks.

If such the case, the pulley 50 is always put into the connected state, and the signal instruction means 47 is made into a cargo handling switch which is disposed so as to interlock the operation of the cargo handling lever. Also in this application, as far as a normal load is applied to the driving shaft 27, the torque limiting means "T" is put into the connected state. The pump is started to discharge by simply turning on the cargo handling switch. Then, when the cargo handling switch is turned off, the pump proceeds to the minimum capacity equal to the zero capacity while it continues the operation. Likewise, if abnormal loads should be applied to the driving shaft 27, the torque limiting means "T" is put into the shut-off state, and thereby the driving force of the engine is not transmitted to the driving shaft 27. As a result, the pulley 50 is rotated idly without causing internal breakages. When the overloads are removed, the pulley 50 and the driving shaft 27 are connected again, and the pump is put back into the original function.

In the First and Second Preferred Embodiments, the present fluidic apparatus is embodied as the variable capacity piston pump. However, it is apparent from the foregoing descriptions that the present fluidic apparatus can be embodied as variable capacity compressors.

Having now fully described the present invention, it will be apparent to one of ordinary skill in the art that many changes and modifications can be made thereto without departing from the spirit or scope of the present invention as set forth in the appended claims.

What is claimed is:

1. A fluidic apparatus, comprising:
   a pulley for driven coupling to an engine;
   torque limiting means disposed in said pulley for interrupting the transmission of driving force by said pulley when overload is applied thereto; and
   a driving shaft coupled to an output of said torque limiting means;
   said torque limiting means including:
      a boss formed coaxially with said pulley and having an outer peripheral surface;

a collar disposed integrally and coaxially with said driving shaft and having an outer peripheral surface; and a coiled spring coiled with a predetermined tightening allowance about said outer peripheral surfaces of said boss and said collar for transmitting driving force to said shaft in the absence of an overload.

2. The fluidic apparatus according to claim 1, wherein said coiled spring is wound in the same direction as the direction of rotation of said pulley.

3. The fluidic apparatus according to claim 1, wherein said coiled spring is fixed to said boss at one end.

4. The fluidic apparatus according to claim 1, wherein said coiled spring has a greater number of turns over said outer peripheral surface of said boss than over said outer peripheral surface of said collar.

5. The fluidic apparatus according to claim 1, further comprising:

a swash plate disposed inclinably on said driving shaft;

a control spring for urging said swash plate to reduce the inclination angle of said swash plate;

a control cylinder for urging said swash plate to oppose the control spring and increase the inclination angle of said swash plate; and an opening and closing valve disposed in a pressure fluid passage for introducing pressure fluid into said control cylinder;

whereby said fluidic apparatus operates as a variable capacity pump.

6. The fluidic apparatus according to claim 1, wherein said coiled spring is fixed to said collar at one end.

7. The fluidic apparatus according to claim 1, wherein said coiled spring has a greater number of turns over said outer peripheral surface of said collar than over said outer peripheral surface of said boss.

8. A fluidic apparatus, comprising:

a pulley for driven coupling to an engine;

torque limiting means disposed in said pulley for interrupting the transmission of driving force by said pulley when overload is applied thereto; and a driving shaft coupled to an output of said torque limiting means;

said torque limiting means including:

a boss formed coaxially with said pulley and having an outer peripheral surface;

a collar disposed integrally and coaxially with said driving shaft and having an outer peripheral surface; and a coiled spring coiled with a predetermined tightening allowance about said outer peripheral surfaces of said boss and said collar for transmitting driving force to said shaft in the absence of an overload, said coiled spring being wound in the same direction as the direction of rotation of said pulley with one end fixed to one of said outer peripheral surfaces and having a greater number of turns over one of said outer peripheral surfaces than over the other of said outer peripheral surfaces.

9. The fluidic apparatus according to claim 8, further comprising:

a swash plate disposed inclinably on said driving shaft;

a control spring for urging said swash plate to reduce the inclination angle of said swash plate;

a control cylinder for urging said swash plate to oppose the control spring and increase the inclination angle of said swash plate; and an opening and closing valve disposed in a pressure fluid passage for introducing pressure fluid into said control cylinder;

whereby said fluidic apparatus operates as a variable capacity pump.

* * * * *